Sept. 25, 1962      P. O. PFEIFFER      3,055,456
HYDRAULIC BRAKE

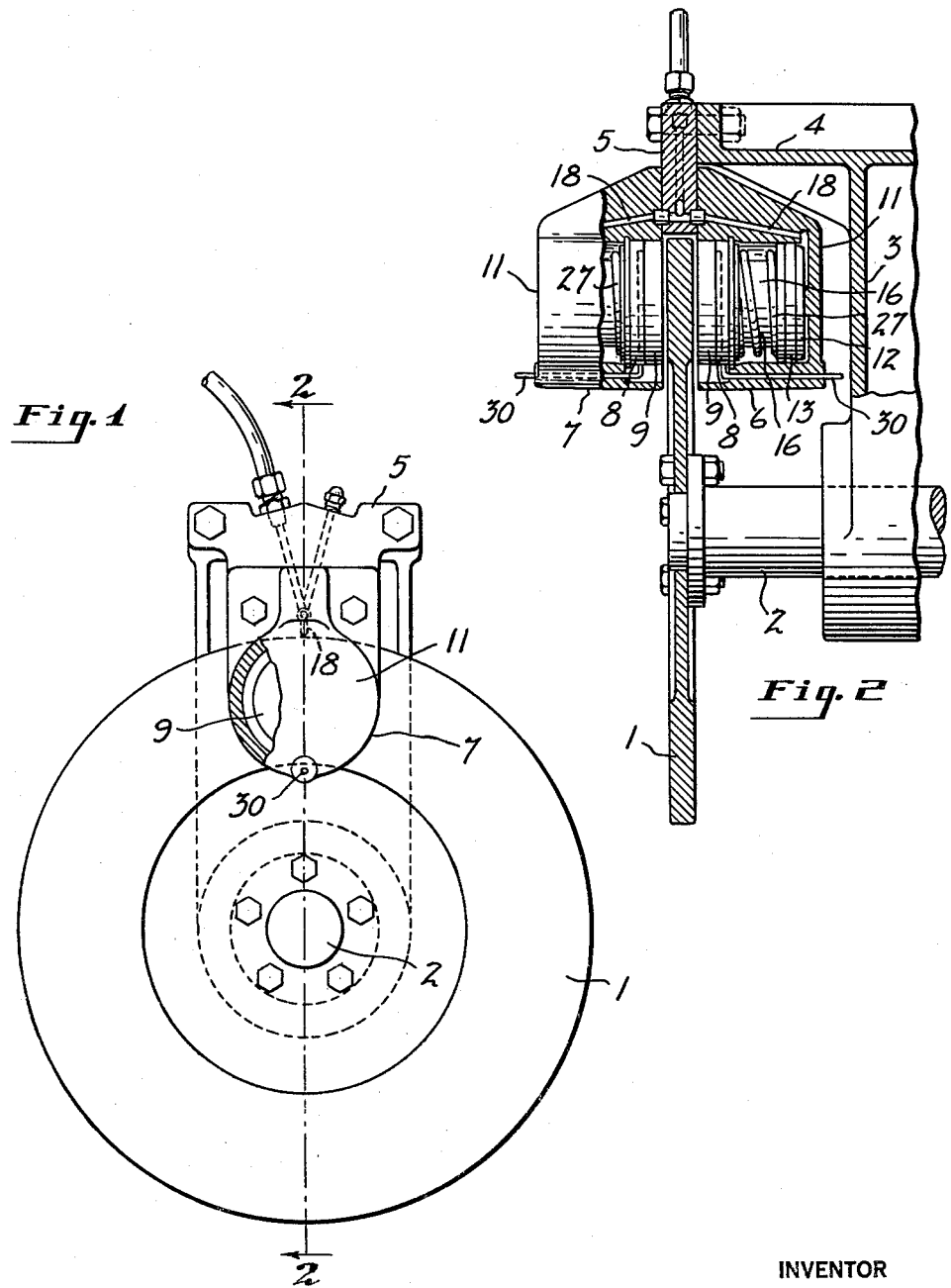

Filed Feb. 16, 1960      2 Sheets-Sheet 2

INVENTOR
Paul O. Pfeiffer
BY McCoy, Greene & te Grotenhuis
ATTORNEYS

United States Patent Office 3,055,456
Patented Sept. 25, 1962

3,055,456
HYDRAULIC BRAKE
Paul O. Pfeiffer, Cuyahoga Falls, Ohio, assignor to The General Tire & Rubber Company, Akron, Ohio, a corporation of Ohio
Filed Feb. 16, 1960, Ser. No. 9,129
3 Claims. (Cl. 188—73)

This invention relates to hydraulic brakes and more particularly to a disk brake with a hydraulic actuating mechanism that automatically compensates for wear and that maintains a substantially constant running clearance between the brake block and disk when the brake is off and in which there is substantially no variation in the length of stroke of the primary brake actuator.

The brake of the present invention is of the type in which a brake block is mounted in a housing for movement into and out of its braking position and in which the brake is applied by means of an hydraulic actuator. The present invention employs a primary expansible pressure chamber for applying braking pressure and an auxiliary expansible pressure chamber between the primary chamber and the brake block that serves to move the brake block to braking position and to apply a gradually increasing braking pressure before the primary brake actuator becomes effective and in which the two pressure chambers are so interconnected that the movable wall of the primary pressure chamber which serves as the primary brake actuator is restricted to a relatively small movement from its off position to its brake applying position and in which the brake block is interlocked with the movable wall of the primary actuating chamber during its return movement to insure the desired minimum running clearance between the brake block and the rotary member to which it is applied in the off position of the brake.

As herein shown the primary and secondary pressure chambers are preferably in the form of axially alined cylinders and pistons, the cylinder and piston forming the secondary pressure chamber being of smaller diameter than the cylinder and piston forming the primary pressure chamber. A passage connects the primary and secondary pressure chambers through which pressure fluid is admitted to the secondary pressure chamber. The secondary pressure chamber is formed by a cylinder and piston, one movable with the brake block and the other with the primary piston and is preferably coaxial with the primary cylinder and piston. A spring acts against the primary piston, biasing it toward a predetermined off position which may be against the outer end wall of its cylinder. A valve is provided in the passage connecting the primary and secondary pressure chambers and this valve is held in open position while the piston is within a short predetermined distance from its off position and is automatically closed when the primary piston has moved through said predetermined distance.

When hydraulic pressure is applied to the primary chamber the pressure in the primary and secondary chambers is the same while the valve is open, so that the brake block is moved to braking position while the actuating piston is held against movement by the spring. After the movement of the brake block is arrested by engagement with the rotating member, pressure builds up in the pressure chambers until the thrust on the larger primary piston is enough in excess of the outward thrust of the fluid in the secondary chamber to move the piston in opposition to the spring. After the primary piston has moved through a short predetermined distance from its off position that corresponds to a desired minimum running clearance between the brake and disk when the brake is off, the valve is automatically closed so that the brake block and the primary actuating piston are hydraulically interlocked for movement in unison during brake application and during return of the piston to its off position by the spring after the hydraulic pressure is released.

The inward movement or actuating stroke of the primary piston is always through a distance only slightly in excess of the predetermined distance through which the valve is held closed, so that there is substantially no variation in the pressure that is maintained on the piston by the return spring. The brake block is always returned from its engaging position a distance corresponding to the return movement of the primary piston so that a predetermined minimum running clearance between the brake block and the rotary member is provided. The brake block will have relative movement with respect to the primary piston sufficient to compensate for wear on the brake lining and its running clearance will be substantially the same regardless of the wear of the brake lining. No adjustment of parts is required after installation or after relining of brakes since, regardless of the initial position of the brake block with respect to the piston, its running clearance is automatically established after the first application of the brake.

A wear indicator may be provided in the form of a rod attached to the brake block that extends axially through a portion of the housing laterally of the actuating cylinders and that projects through the outer wall of the housing to show the extent of wear of the brake lining.

Referring to the accompanying drawings forming part of this specification:

FIGURE 1 is a side elevation of a brake and a rotatable disk to which it is applied;

FIG. 2 is a vertical section taken on the line indicated at 2—2 in FIG. 1;

Figure 3:
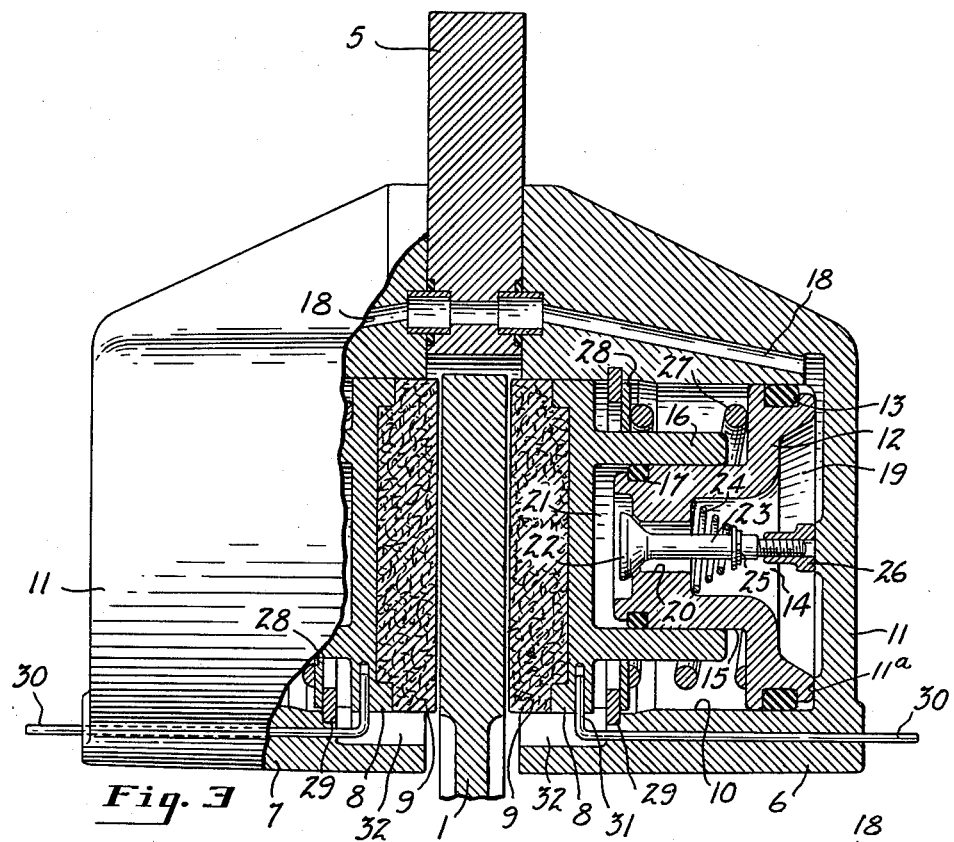
FIG. 3 is a vertical section on an enlarged scale showing an axial section through the brake block and actuating cylinders of one of the housings, the brake being shown in its off position.
Figure 5:
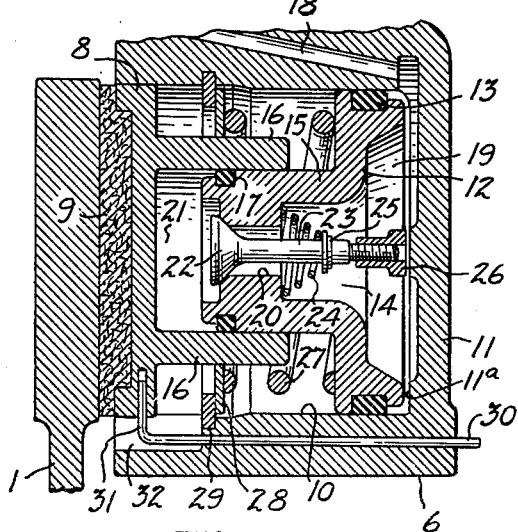
FIG. 5 shows a brake in which a considerable portion of the brake lining has worn away and the position of the parts in brake applying position.
Figure 4:
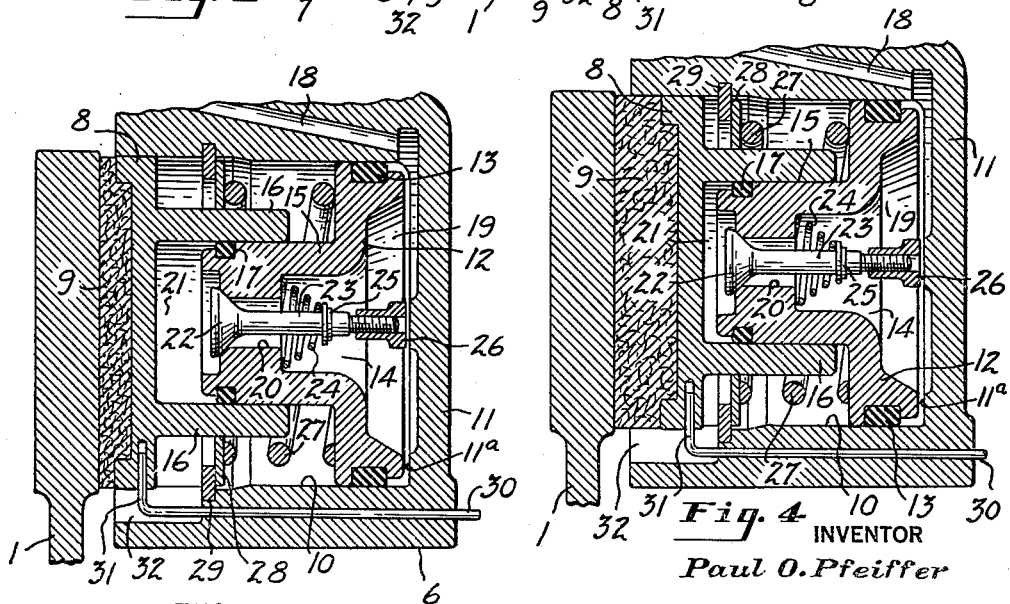
FIG. 4 is a fragmentary sectional view similar to FIG. 3, showing the brake applied.

In the accompanying drawings the invention is shown applied to a brake for a rotating disk 1 attached to a shaft 2 journaled in a frame 3 which has a projecting flange 4 above the top edge of the disk to which is attached a plate 5 that is alined with the plane of the disk and to which are attached two identical brake housings 6 and 7 which are disposed in alinement on opposite sides of the disk 1. The housings 6 and 7 support identical brake blocks 8 which have linings 9 for engagement with the opposite faces of the disk 1 and which are slidably mounted in cylinders 10 which are coaxial and which extend at right angles to the face of the disk. Since the brake blocks are identical and provided with identical actuating mechanisms for simultaneous application and since one of the brake mechanisms may be replaced by a backup plate, a single brake mechanism will be described.

A cylinder 10 has a closed outer end 11 and adjacent the outer end 11 has an actuating piston 12 mounted therein. The piston 12 has a packing ring 13 which has sealing engagement with the cylinder 10 and is provided with a recessed outer face 14. The piston 12 has an externally cylindrical axial projection 15 which fits within an internally cylindrical flange 16 coaxial with the cylinder 10 and projecting outwardly from the brake block 8. A packing ring 17 provides a seal between the projection 15 which serves as a piston and the flange 16 which forms a cylinder for the piston 15.

A passage 18 for hydraulic fluid under pressure delivers into the space between the piston 12 and the outer wall 11 of the cylinder, the said space forming a primary pressure chamber 19. An axial bore 20 through the piston 12 delivers fluid from the chamber 19 to a secondary pressure chamber 21 formed by the piston 15 and cylinder 16. A valve 22 is provided for opening and closing the passage formed by the bore 20. The valve 22 is movable axially outwardly from its open to its closed position and has a stem projecting axially outwardly through the bore 20 toward the end wall 11 of the cylinder. The valve 22 is biased toward its closed position by means of a spring 24 that is interposed between the recessed face of the piston 12 and a collar 25 on the stem 23 to maintain an outward thrust on the stem 23 to bias the valve 22 toward its closed position. The effective length of the stem 23 may be varied by means of a threaded sleeve extension 26 which may be turned on the body of the stem 23 to lengthen or shorten the stem. When the piston 12 is in engagement with the end wall 11 the sleeve 26 of the valve stem engages the end wall 11 and holds the valve 22 in open position so that hydraulic fluid under pressure admitted to the chamber 19 will pass through the bore 20 to the secondary chamber 21. The piston 12 is biased toward its outermost off position by means of a coil spring 27 that surrounds the cylindrical flange 16 of the brake block and that is interposed between the piston 12 and a washer 28 that is seated against a stop ring 29 and that is secured in a groove of the cylinder 10 outwardly of the brake block 8. The spring 27 presses the piston 12 toward its outermost off position where it engages with a suitable fixed stop such as the raised peripheral portion 11a of the inner face of the end wall 11 as shown in FIG. 3.

When hydraulic fluid under pressure is admitted through the passage 18 to the primary chamber 19, the fluid passes through the bore 20 to the secondary pressure chamber 21 and, while the primary piston 12 is held in its off position by the spring 27, the brake block 8 is moved to its engaging position. When the movement of the brake block is arrested by engagement with the disk, the pressure builds up in both chambers 19 and 21, gradually increasing the pressure applied to the brake until the thrust exerted on the outer face of the piston 12 by the fluid in the chamber 19 exceeds the pressure exerted on the projection 15 by the fluid in the chamber 21 by an amount sufficient to overcome the thrust of the return spring 27, after which the piston 12 is moved outwardly. When the movement of the piston 12 is sufficient to free the stem 23 from the outer wall of the cylinder, the valve 22 is closed by the spring 24 so that a hydraulic interlock is provided between the brake block 8 and the actuating piston 12 which causes the brake block and piston to move in unison as the piston is moved outwardly by the pressure in the primary chamber 19 to take up wear on the brake block during an application of the brake and to return the brake block with the piston upon release of hydraulic pressure.

Means may be provided for indicating the wear on the brake lining. As herein shown the indicating means is in the form of a rod 30 that extends axially through the brake housing outwardly of the cylinder 10 and which has an inwardly bent end portion 31 that is attached to the brake block 8. The portion 31 of the indicator rod projects radially from the periphery of the brake block 8 and extends into an axially extending slot 32 in the wall of the cylinder 10. The rod 30 extends axially from the slot 32 and is of a length such that it initially projects past the outer wall of the housing 6 when the brake is applied a distance corresponding to the thickness of the brake lining 9. When the brake lining 9 is new the length of the pin 30 that projects past the rear wall of the housing is equal to the thickness of the new brake block so that as the lining 9 wears away the projection of the pin 30 past the outer housing wall when the brake is applied corresponds to the thickness of the worn brake lining.

The slot 32 serves to maintain atmospheric pressure within the cylinder 10 between the piston 12 and the brake block 8 exteriorly of the cylindrical flange 16 and projection 15 that form the secondary pressure chamber so that entrapment of air that would offer resistance to relative movements of the piston 12 and brake block 8 is prevented. The axial play permitted between the brake block 8 and the piston 12 may vary but must be enough to accommodate a new brake lining 9 between the inner face of the brake block and the disk 1 and provide a desired minimum running clearance when the brake is off. As the brake lining wears away the range of possible movement of the brake block is increased but the movement of the piston 12 during application of the brake remains substantially constant because of the fact that the brake block is always moved into engagement with the disk before the piston 12 begins its movement and, after the piston 12 has moved through a distance sufficient to cause closing of the valve 22, the additional movement of the piston is only that required to compensate for any compression of the brake lining or springing of the housing after full braking pressure is applied and to take up the wear on the brake block during application of the brake. Because of the hydraulic interlock between the brake block 8 and the piston 12, the brake block returns with the piston during its return movement to its off position after the pressure has been reduced enough to relieve the distortion of the brake lining and housing and to an amount less than the pressure exerted by the spring 27, with the result that the clearance between the disk and the brake block is equal to the return movement of the piston 12 after the pressure has been reduced sufficiently to permit actuation of the piston 12 by the spring 27 and exceeds the distance through which the piston 12 moves after the valve stem sleeve 26 engages the end wall 11 only by the amount of wear on the brake lining during the application of the brake.

The movement of the piston 12 necessary to cause closure of the valve 22 which is determined by the adjustment of the sleeve 26, may be termed the "built in clearance" which is the desired minimum running clearance between the disk and brake block which is automatically established upon initial application of the brake. A very slight movement of the piston 12 is sufficient for each brake application because the shifting of the brake block is effected by the secondary pressure chamber, the outward pressure exerted on the piston 12 by the spring 27 being substantially constant regardless of the wear on the brake lining and the mechanism having maximum simplicity because no adjustment of the spring or piston to compensate for wear is required.

Since the fluid pressure in the chamber 19 that resists movement of the piston 12 by the return spring 27 is not opposed by the fluid pressure in the chamber 21 when the valve 22 is closed and is effective upon the entire area of the piston 12, the fluid pressure required to hold the piston 12 against return movement is much less than that required for initial actuation with the valve 22 open, so that, by providing a return spring of proper strength, the return of the piston 12 and the release of the brake will occur only after the pressure in the chamber 19 is insufficient to return the brake block 8 into engagement with the disk 1 after the valve 22 is opened.

It is necessary that the pressure in the supply line 18 and chamber 21 be low while the brake is off but a complete release of pressure is not necessary since a pressure of at least three pounds per square inch in the chamber 21 is ordinarily required to move the brake block 8. It is desirable that the residual or locked in pressure in the supply line 18 and chamber 19 be not more than 2 or 3 pounds but a close tolerance is not essential, since, unless the residual pressure be substantially in excess of that necessary to move the brake block, there will be no dragging of the brake for the reason that the rotating disk upon contact with the brake lining will exert a substantial thrust on the brake block in a direction to move it away from the disk and the fluid in the chamber 21 will flow outwardly past the valve 22 to permit movement of the brake block away from the disk.

While it is desirable in the interest of compactness to limit the amount of play between the brake block 8 and the piston 12, there may be considerable variation in the amount of play since, regardless of the extent of relative movement permitted between the brake block 8 and piston 12, the movement of the piston 12 is determined solely by the adjustment of the sleeve extension 26 of the valve stem 23.

Relining of the brake is facilitated since no initial adjustment of the position of the brake block with respect to the piston 12 is necessary. Regardless of the initial position of the brake block 8 with respect to the disk, the brake block is shifted into engagement with the disk 1 before the piston 12 begins its movement and the hydraulic interlock provided by the valve 22 and chamber 21 insures return of the brake block a distance corresponding to the return movement of the piston 12, so that regardless of the initial setting of the brake block 8 with respect to the piston 12, the brake block will be automatically adjusted to the desired minimum running clearance upon the first application of the brake.

It is to be understood that in accordance with the provisions of the patent statutes, variations and modifications of the specific devices herein shown and described may be made without departing from the spirit of the invention.

What I claim is:

1. A hydraulic brake comprising a disk, a brake housing alongside said disk, a cylinder in said housing having an open inner end adjacent said disk and an end wall closing its outer end, a brake actuating piston in said cylinder that provides a primary pressure chamber between itself and the outer end of the cylinder, a brake block slidably mounted in said cylinder inwardly of said piston for movement into and out of engagement with said disk, a secondary pressure chamber of less diameter than said primary chamber between said piston and said brake block and formed by a cylinder and piston, one attached to said brake block and the other to said piston, means for establishing hydraulic pressure in said primary chamber, a spring biasing said actuating piston toward its outermost off position, a passage through said actuating piston connecting said primary and secondary pressure chambers, an axially movable valve for opening and closing said passage, said valve being movable outwardly to its closed position and having a stem engageable with said end wall for holding the valve in open position during a predetermined inward movement of said piston from its off position, a spring biasing said valve toward its closed position, and means for varying the length of the valve stem to increase or decrease the inward movement of the piston prior to the closing of the valve.

2. A hydraulic brake comprising a movable member, a brake block mounted for linear movement toward and away from its braking position in engagement with said movable member, a housing having a primary expansible pressure chamber provided with an inner wall movable from a predetermined off position toward said block and a secondary expansible pressure chamber interposed between said movable wall and said block, said secondary chamber being expansible in the direction of movement of said block and having a movable inner wall that is attached to said block for movement therewith and that has less surface area exposed to pressure than the movable wall of said primary chamber, yieldable means for maintaining an outward thrust on the movable wall of said primary chamber to bias the same to its off position, means for establishing hydraulic pressure in said primary chamber to expand the same, and means for maintaining communication between said chambers while the movable wall of said primary chamber is in its off position and during its movement for a predetermined distance inwardly from its off position to expand said secondary chamber and move said block to its braking position, for automatically cutting off communication between said chambers when the movable wall of said primary chamber has moved said predetermined distance from its off position to hydraulically interlock said movable walls to transmit the thrust of the main pressure chamber to said brake block during application of the brake and to constrain said block to move away from its braking position with the movable wall of said primary chamber during the initial portion of the return movement of the last mentioned wall to its off position and for automatically reestablishing communication between said chambers to free the movable wall of said secondary pressure chamber and said brake block from the movable wall of said primary chamber when the movable wall of said primary chamber is again at said predetermined distance from its off position.

3. A hydraulic brake comprising a movable member, a brake block mounted for linear movement toward and away from its braking position in engagement with said movable member, a housing having a primary expansible pressure chamber provided with an inner wall movable from a predetermined off position toward said block and a secondary expansible pressure chamber interposed between said movable wall and said block, said secondary chamber being expansible in the direction of movement of said block and having a movable inner wall that is attached to said block for movement therewith and that has less surface area exposed to pressure than the movable wall of said primary chamber, yieldable means for maintaining an outward thrust on the movable wall of said primary chamber to bias the same to its off position, means for establishing hydraulic pressure in said primary chamber to expand the same, means for maintaining communication between said chambers while the movable wall of said primary chamber is in its off position and until it has moved a predetermined distance inwardly from its off position to expand said secondary chamber and move said block to its braking position and for cutting off communication between said chambers after the movable wall of said primary chamber has moved said predetermined distance from its off position to hydraulically interlock said movable walls to transmit the thrust of the main pressure chamber to said brake block during application of the brake and to constrain said block to move away from its braking position with the movable wall of said primary chamber during the initial portion of the return movement of the last mentioned wall to its off position and to free the movable wall of said secondary pressure chamber and said brake block from the movable wall of said primary chamber during the latter portion of said return movement, and means for increasing or decreasing the extent of inward movement of the movable wall of the primary chamber during which communication is maintained between the primary and secondary pressure chambers.

References Cited in the file of this patent
UNITED STATES PATENTS

| | | |
|---|---|---|
| 2,638,750 | Hettinger | May 19, 1953 |
| 2,817,419 | Wolf | Dec. 24, 1957 |
| 2,817,421 | Bricker | Dec. 24, 1957 |
| 2,928,246 | Sjodin | Mar. 15, 1960 |
| 3,004,390 | Duffy | Oct. 17, 1961 |

FOREIGN PATENTS

| | | |
|---|---|---|
| 217,679 | Australia | Oct. 15, 1958 |
| 805,206 | Great Britain | Dec. 3, 1958 |